(12) United States Patent
Myong et al.

(10) Patent No.: US 6,349,022 B1
(45) Date of Patent: Feb. 19, 2002

(54) LATCHING PROTECTION CIRCUIT

(75) Inventors: Inho Myong, Newark, CA (US); Michael Brown, Clawson, MI (US); Douglas A. Burcicki, New Baltimore, MI (US); Glen A. DeGrendel, Sterling Heights, MI (US)

(73) Assignees: Tyco Electronics Corporation, Middletown, PA (US); EWD, L.L.C., El Paso, TX (US)

( * ) Notice: Subject to any disclaimer, the term of this patent is extended or adjusted under 35 U.S.C. 154(b) by 0 days.

(21) Appl. No.: 09/545,845

(22) Filed: Apr. 7, 2000

Related U.S. Application Data

(63) Continuation of application No. 09/357,520, filed on Jul. 19, 1999, now abandoned, which is a continuation of application No. 09/156,933, filed on Sep. 18, 1998, now abandoned.

(51) Int. Cl.[7] .................................................. H02H 3/00
(52) U.S. Cl. ....................................... 361/93.1; 361/57
(58) Field of Search ............................... 361/10, 11, 26, 361/27, 103, 105, 106, 111, 57, 58, 93.1; 338/22 R, 23, 229 D

(56) References Cited

U.S. PATENT DOCUMENTS

| | | |
|---|---|---|
| 2,376,658 A | 5/1945 | Charbonneau et al. ...... 175/294 |
| 2,980,779 A | 4/1961 | Hickle et al. ................ 200/113 |
| 3,209,206 A | 9/1965 | Courtin ........................ 317/41 |
| 3,840,834 A | 10/1974 | Obenhaus et al. ............. 337/79 |
| 3,846,674 A | 11/1974 | McNulty ................... 317/13 C |
| 3,950,741 A | 4/1976 | Schroeder ................... 340/251 |
| 4,019,097 A | 4/1977 | Miller et al. ................... 316/93 |
| 4,237,441 A | 12/1980 | van Konynenburg et al. . 338/22 R |
| 4,237,508 A | 12/1980 | Woods et al. ................. 361/24 |
| 4,238,812 A | 12/1980 | Middleman et al. ......... 361/106 |
| 4,315,237 A | 2/1982 | Middleman et al. ...... 338/22 R |
| 4,317,027 A | 2/1982 | Middleman et al. ......... 219/553 |

(List continued on next page.)

FOREIGN PATENT DOCUMENTS

| | | | |
|---|---|---|---|
| CH | 549 282 | 5/1974 | .......... H01H/83/14 |

(List continued on next page.)

OTHER PUBLICATIONS

European Search Report for European Patent Application No. 00202978 dated Feb. 13, 2001.
International Search Report for International Application No. PCT/US97/11903, mailed Oct. 28, 1997.
International Search Report for International Appplication No. PCT/US97/12571, mailed Nov. 10, 1997.

*Primary Examiner*—Michael J. Sherry
*Assistant Examiner*—Kim Huynh

(57) ABSTRACT

An overcurrent protection system gives rapid response to relatively small overcurrents has a sensor element and an interruption element in series between a power source and a load. The sensor element is functionally linked to the circuit interruption element via a control element. When current exceeds a predetermined amount, the sensor element transfers heat to the control element which causes the circuit interruption element to change from a conducting state to non-conducting fault state. A latching arrangement causes the protection system to remain in the non-conducting fault state until reset. The control element may include a PTC device or a bimetal switch.

12 Claims, 2 Drawing Sheets

U.S. PATENT DOCUMENTS

| | | | |
|---|---|---|---|
| 4,319,299 A | 3/1982 | Woods et al. | 361/24 |
| 4,426,633 A | 1/1984 | Taylor | 338/25 |
| 4,450,496 A | 5/1984 | Doljack et al. | 361/58 |
| 4,518,850 A | 5/1985 | Grasso | 219/505 |
| 4,545,926 A | 10/1985 | Fouts et al. | 252/511 |
| 4,574,229 A | 3/1986 | Kim | 318/788 |
| 4,635,020 A | 1/1987 | Sako | 337/49 |
| 4,677,281 A | 6/1987 | Mills | 219/505 |
| 4,682,133 A | 7/1987 | Kern | 335/128 |
| 4,689,475 A | 8/1987 | Matthiesen | 219/553 |
| 4,724,417 A | 2/1988 | Au et al. | 338/22 R |
| 4,774,024 A | 9/1988 | Deep et al. | 252/511 |
| 4,780,598 A | 10/1988 | Fahey et al. | 219/511 |
| 4,785,274 A | 11/1988 | Sako et al. | 337/49 |
| 4,800,253 A | 1/1989 | Kleiner et al. | 219/553 |
| 4,808,961 A | 2/1989 | Sako et al. | 337/49 |
| 4,827,232 A | 5/1989 | Minks | 219/553 |
| 4,845,838 A | 7/1989 | Jacobs et al. | 29/671 |
| 4,857,880 A | 8/1989 | Au et al. | 338/22 R |
| 4,859,836 A | 8/1989 | Lunk et al. | 219/548 |
| 4,907,340 A | 3/1990 | Fang et al. | 29/610.1 |
| 4,908,594 A | 3/1990 | Akiike et al. | 337/49 |
| 4,924,074 A | 5/1990 | Fang et al. | 219/548 |
| 4,935,156 A | 6/1990 | van Konynenburg | 219/553 |
| 4,967,176 A | 10/1990 | Horsma et al. | 338/22 R |
| 5,049,850 A | 9/1991 | Evans et al. | 338/22 R |
| 5,089,801 A | 2/1992 | Chan et al. | 338/22 R |
| 5,264,766 A | 11/1993 | Tracht et al. | 318/443 |
| 5,296,996 A | 3/1994 | Hansson et al. | 361/24 |
| 5,378,407 A | 1/1995 | Chandler et al. | 252/513 |
| 5,590,010 A | 12/1996 | Ceola et al. | 361/93 |
| 5,627,084 A | 5/1997 | Yamazaki et al. | |
| 5,666,254 A | 9/1997 | Thomas et al. | 361/8 |
| 5,689,395 A | 11/1997 | Duffy et al. | 361/93 |
| 5,737,160 A | 4/1998 | Duffy | 361/3 |
| 5,874,885 A | 2/1999 | Chandler et al. | 338/22 |
| 5,939,731 A | 8/1999 | Yamazaki et al. | |
| 6,130,597 A | 10/2000 | Toth et al. | 338/22 R |

FOREIGN PATENT DOCUMENTS

| | | | |
|---|---|---|---|
| DE | 120 564 | 6/1976 | H01H/61/01 |
| DE | 29 35 807 A1 | 4/1981 | H02H/3/08 |
| DE | 43 00 909 A1 | 7/1994 | H01H/37/52 |
| EP | 0 661 790 A2 | 7/1995 | H02H/9/02 |
| EP | 0 829 939 A2 | 3/1998 | H02H/3/08 |
| FR | 2 653 593 | 4/1991 | H01H/51/08 |
| FR | 2 294 538 | 7/1996 | H01H/73/48 |
| GB | 564 822 | 10/1944 | |
| GB | 1 309 819 | 3/1973 | H02H/3/08 |
| GB | 2 020 904 | 11/1979 | H01H/51/34 |
| GB | 2 047 487 | 11/1980 | H05B/3/18 |
| GB | 2 056 204 | 3/1981 | H02H/5/04 |
| GB | 2 220 296 A | 1/1990 | |
| GB | 2 236 018 | 3/1991 | H01H/61/01 |
| JP | 64-19647 | 1/1989 | H01H/61/01 |
| JP | 3-147224 | 6/1991 | H01H/61/01 |
| JP | 9-308077 | 11/1997 | H02H/3/08 |
| RU | 1742926 | 6/1992 | H02H/3/08 |
| SU | 1501190 A1 | 8/1989 | H01H/71/16 |
| WO | WO 96/29711 A | 9/1996 | |

LATCHING PROTECTION CIRCUIT

RELATED APPLICATIONS

This is a continuation of U.S. patent application Ser. No. 09/357,520, filed Jul. 19, 1999, now abandoned, which is a continuation of U.S. patent application Ser. No. 09/156,933, filed on Sep. 18, 1998, now abandoned, which is a continuation of U.S. patent application Ser. No. 08/682,067, filed on Jul. 16, 1996, now abandoned, the disclosures of which are incorporated herein by reference.

BACKGROUND OF THE INVENTION

1. Field of the Invention

This invention relates to electrical circuit overcurrent protection.

2. Introduction to the Invention

Positive temperature coefficient (PTC) circuit protection devices are well known. The device is placed in series with a load, and under normal operating conditions is in a low temperature, low resistance state. However, if the current through the PTC device increases excessively, and/or the ambient temperature around the PTC device increases excessively, and/or the normal operating current is maintained for more than the normal operating time, then the PTC device will be "tripped," i.e. converted to a high temperature, high resistance state such that the current is reduced substantially. Generally, the PTC device will remain in the tripped state, even if the current and/or temperature return to their normal levels, until the PTC device has been disconnected from the power source and allowed to cool. Particularly usefill PTC devices contain a PTC element which is composed of a PTC conductive polymer, i.e. a composition which comprises (1) an organic polymer, and (2) dispersed, or otherwise distributed, in the polymer, a particulate conductive filler, preferably carbon black. PTC conductive polymers and devices containing them are described, for example in U.S. Pat. Nos. 4,237,441, 4,238, 812, 4,315,237, 4,317,027, 4,426,633, 4,545,926, 4,689,475, 4,724,417, 4,774,024, 4,780,598, 4,800,253, 4,845,838, 4,857,880, 4,859,836, 4,907,340, 4,924,074, 4,935,156, 4,967,176, 5,049,850, 5,089,801 and 5,378,407, the disclosures of which are incorporated herein by reference for all purposes.

In a batch of PTC devices made by the same manufacturing process, uncontrollable variations in the process can cause substantial variation in the conditions which will trip any individual device. The largest steady state current which will not cause any of the devices in the batch to trip is referred to herein as the "pass current" ($I_{PASS}$) or "hold current", and the smallest steady state current which will cause all of the devices to trip is referred to as the "trip current" ($I_{TRIP}$). In general, the difference between $I_{PASS}$ and $I_{TRIP}$ decreases slowly as the ambient temperature increases. Depending on the particular type of device, $I_{TRIP}$ may for example be 1.5 to 2.5 times $I_{PASS}$ at 20° C. For any individual device, the pass current and the trip current are the same. However, in this specification, reference is made to a PTC device having an $I_{PASS}$ and a different $I_{TRIP}$, because as a practical matter, the manufacturer of an electrical switch must make use of PTC devices taken from a batch of such devices. Generally, the higher the ambient temperature, the lower the pass current and the trip current. This phenomenon is referred to as "thermal derating", and the term "derating curve" is used to denote a graph of temperature against pass current.

A limitation on the known uses of PTC protection devices is that when a PTC device is placed in series with the load and sized to conduct the normal circuit current, the PTC device can take a relatively long time to convert to its tripped state on an overcurrent which is, e.g., up to a few times the normal circuit current.

SUMMARY OF THE INVENTION

The invention provides a new overcurrent protection system which will give a rapid response to even relatively small overcurrents. In the new system, a sensor element and circuit interruption element are placed in series with the load. The sensor element is functionally linked to the circuit interruption element via a control element, so that, when the current in the circuit exceeds a predetermined amount, the sensor element senses the overcurrent and communicates with the control element. The control element causes the circuit interruption element to change from a relatively conductive normal state to a relatively non-conductive fault state (including a completely open state) and remain latched in the fault state until reset.

In an example of a preferred embodiment of circuit arrangements of the invention, the sensor element comprises a resistive device connected in series with the load, and the control element comprises a PTC device which is thermally linked to the resistive device and is electrically connected to the circuit interruption element. When an overcurrent passes through such a system, the resistive device increases in temperature causing the PTC device to heat up and trip to its high resistance state. The PTC device is linked to the circuit interruption element so that the increased resistance of the PTC device causes the circuit interruption element to switch into its fault state. The PTC device is not placed in series with the load and therefore may operate at current levels much less than the normal circuit current which passes through the load.

The thermal linking of a resistive device with a PTC device is known in the art. A current to be measured and/or controlled passes through the resistive device. $I^2R$ heating of the resistive device causes the PTC device to heat up and its resistance increases accordingly. Such resistive devices may comprise resistors, heaters, high resistance wire (e.g. NiChrome), PTC devices and the like. It is known that in order to obtain the desired current/temperature performance of such combinations, certain characteristics of the resistive device must be controlled, particularly in the zone adjacent to the PTC device. Some of the characteristics to be controlled include the resistivity, shape and cross sectional area of the material. The resistive device should be chosen to minimize system impedance while achieving sufficient temperature rise under overcurrent conditions to cause the PTC device to heat up and trip to its high impedance state.

In a second example of a preferred embodiment of the invention, the sensor element comprises a resistive device connected in series with the load, and the control element comprises a bimetal switch which is thermally linked to the resistive device and is electrically connected to the circuit interruption element. When an overcurrent passes through such a system, the resistive device increases in temperature causing the bimetal switch to heat up and trip to its open state. The bimetal switch is linked to the circuit interruption element so that the open condition of the bimetal switch causes the circuit interruption element to switch to its fault state. The bimetal switch is not placed in series with the load and therefore may operate at current levels much less than the normal circuit current which passes through the load.

In a third example of a preferred embodiment of the invention, the function of the sensor element is provided by a bimetal switch which is placed in series with the parallel combination of the load and the control element. When an overcurrent passes through such a system, the bimetal switch increases in temperature and trips to its open state. The control element senses the state change of the sensor element and causes the circuit interruption element to switch to its fault state.

It will be apparent that polymeric PTC devices, ceramic PTC devices, other PTC devices such as bimetal devices, metallic PTC devices, arrangements of solid state devices with PTC characteristics, and devices displaying similar characteristics may be used in the circuit arrangements of this invention to provide reliable overcurrent protection. It will likewise be apparent to those of ordinary skill in the art that mechanical switches used in the circuit arrangements of this invention may include switches, relays, circuit breakers, isolators, bimetal devices and other devices. In addition, a solid state device or combination of solid state devices which provide disconnecting characteristics similar to those provided by mechanical switches may be used in place of the mechanical switches. Bimetal devices have also been referred to as bimetallic devices, electrothermal relays, thermally activated switches and/or electrothermal mechanisms with bimetal elements.

It will be apparent that in the preferred embodiments, this invention permits the use of PTC devices and bimetal switches to be arranged with mechanical switches and other electrical devices to provide reliable protection which protection was not previously available in the art. These and other features, objects and advantages will be understood or apparent to those of ordinary skill in the art from the following detailed description of the preferred embodiments of the invention as illustrated in the various drawing figures.

BRIEF DESCRIPTION OF THE DRAWINGS

For a better understanding of the nature and objects of the invention, reference should be had to the following detailed description of the preferred embodiments of the invention, taken in conjunction with the accompanying drawings, in which like components are given the same reference numerals in each FIG. in which they appear, and in which.

DETAILED DESCRIPTION OF THE INVENTION

Overcurrent protection circuits arranged in accordance with the principles of this invention generally perform the functions of sensing the current, issuing a control signal to interrupt the circuit, interrupting the circuit and partially or completely isolating the load from the power source. The overcurrent protection circuits may be viewed as comprising operational elements which work cooperatively to perform the overcurrent protection functions.

Figure 1:
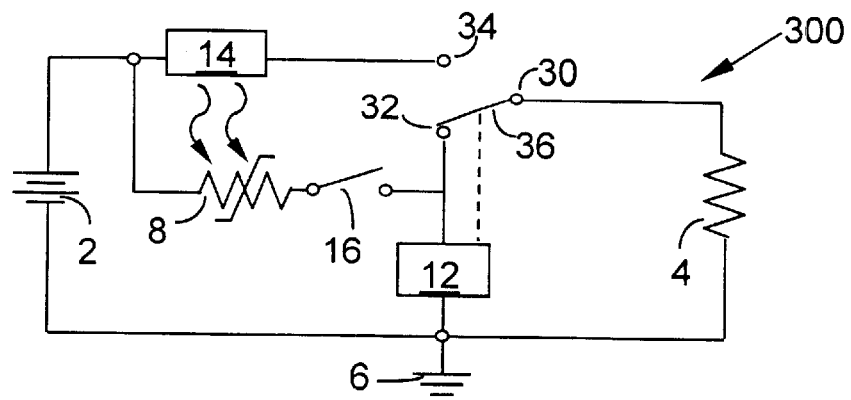
FIG. 1 is a first embodiment of the present invention employing a PTC device.

In some applications, it is preferred that the overcurrent protection circuit not attempt to reset itself, but rather latch open in a fault state. The circuit 300 in FIG. 1 is an example of a circuit protection arrangement in accordance with the first embodiment of the invention, and is an overcurrent protection circuit which will latch open in the fault state. The circuit 300 employs an arrangement of a PTC device 8 with a resistive device 14, a relay coil 12 and a set of relay contacts 30,32,34,36. In the circuit 300, the relay coil 12 is connected to the normally closed contact 32, the load 4 is connected to the center contact 30, and the normally open contact 34 is connected to the resistive element 14. The circuit 300 is initially energized by closing the ON/OFF switch 16. Current flows through the PTC device 8 and the relay coil 12. The relay coil 12 energizes, causing the wiper 36 to move to the normally open contact 34. This places the resistive element 14 in the current path with the load 4. In the event of an overcurrent, the resistive element 14 heats up causing the PTC device 8 to heat up and trip. The relay coil 12 then deenergizes, causing the wiper 36 to return to the normally closed contact 32. The load 4 remains in the circuit, however, with the PTC device 8 in its tripped state, the "trickle current" through the PTC device 8 and the parallel combination of the relay coil 12 and the load 4 is very little, but is sufficient to keep the PTC device 8 from returning to its low impedance state. The ON/OFF switch 16 would have to be opened to permit the PTC device 8 to cool and reset the circuit 300.

Figure 2:
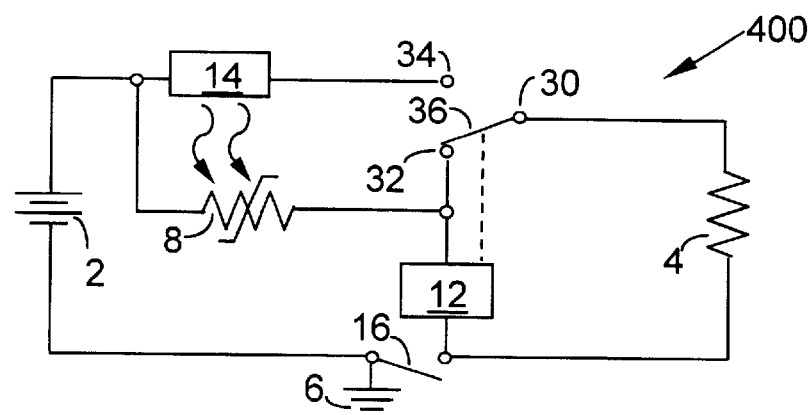
FIG. 2 is a second embodiment of the present invention employing a PTC device.
Figure 5:
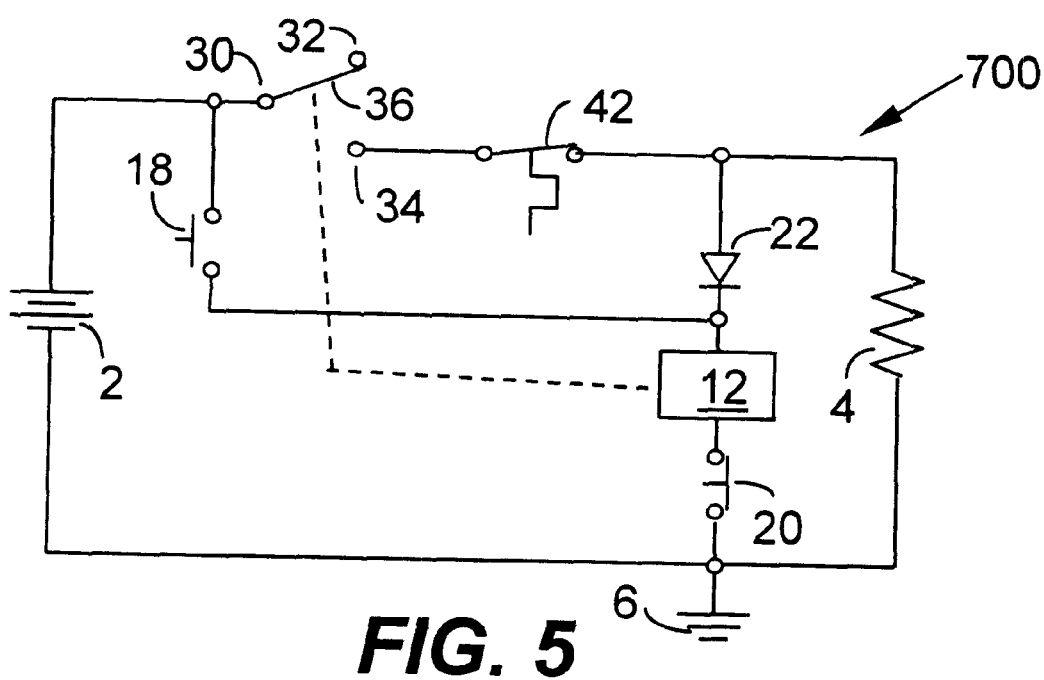
FIG. 5 is a fifth embodiment of the present invention employing a bimetal switch.

The circuit 400 in FIG. 2 is a second example of a circuit protection arrangement in accordance with the invention. The circuit 400 will also latch open in the fault state. The circuit 400 employs an arrangement of a PTC device 8 with a resistive device 14, a relay coil 12 and a set of relay contacts 30,32,34,36, and is similar to the circuit 300 shown in FIG. 1. The ON/OFF switch 16 has been moved to lie between ground 6 and the junction between the relay coil 12 and the load 4. The operation of the circuit 400 shown in FIG. 2 is the same as for the circuit 300 shown in FIG. 1. However, in certain applications, e.g. in the automotive industry, it may be preferred to employ "ground switching" techniques as shown in FIG. 5.

Figure 3:
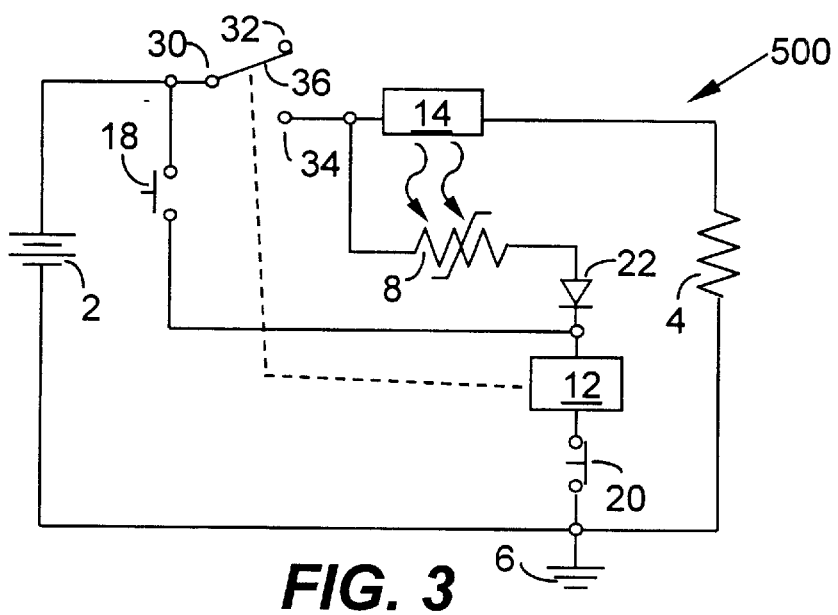
FIG. 3 is a third embodiment of the present invention employing a PTC device.

The overcurrent protection circuits shown in FIGS. 1 and 2 are both capable of latching, i.e. not attempting to reset, when they are in a fault state. Both arrangements require a "trickle current" to keep them latched. In some applications it is preferred to have the overcurrent protection circuit latch open, but not require a trickle current to stay latched. For example, in automobile and other battery-powered applications, a trickle current could run down the battery if allowed to continue for an extended period of time. FIG. 3 shows a third example of an embodiment of an overcurrent protection circuit 500 which will latch open in the fault state. However, unlike the circuits 300,400 shown in FIGS. 1 and 2, respectively, the circuit 500 shown in FIG. 3 does not require a "trickle current" to latch the circuit open in case of an overcurrent. The circuit 500 employs an arrangement of a PTC device 8 with a resistive device 14, a relay coil 12 and a set of relay contacts 30,32,34,36. It also includes a diode 22, a momentary ON switch 18 and a momentary OFF switch 20. The relay contacts 30,32,34,36 are positioned between the power source 2 and the resistive element 14, with the center contact 30 connected to the power source 2 and the normally open contact 32 connected to the resistive element 14. With the circuit 500 in an OFF state, and the PTC device 8 in its low impedance state, the circuit 500 is turned on by momentarily pressing the ON switch 18. Current flows through the relay coil 12, energizing the relay coil 12 and causing the wiper 36 to move to the normally open contact 34. The diode 22 prevents full operating current from power source 2 from flowing through the PTC device 8, the resistive element 14, and the load 4 when the ON switch 18 is closed. With the ON switch 18 released, current flows through the resistive element 14 to the load 4, and also through the series combination of the PTC device 8, the diode 22 and the relay coil 12, thereby keeping the relay coil 12 energized. In case of an overcurrent, the resistive element 14 heats up causing the PTC device 8 to heat up and trip to its high impedance state. The reduced current causes the relay coil 12 to deenergize and the wiper 36 to move to the normally closed contact 32. Current ceases to flow in the circuit 500, and the PTC device 8 cools and returns to its low resistance state. The momentary OFF switch 20 is used to turn the circuit OFF under normal operating conditions.

In each of the circuits shown in FIGS. 1, 2 and 3, the PTC device 8 is shown connected so that it provides overcurrent protection to the respective circuit, but does not have to carry the load current. Thus in circuits protection arrangements according to the invention, a PTC device can be used to control a load current which is higher than the current rating of the PTC device.

Figure 4:
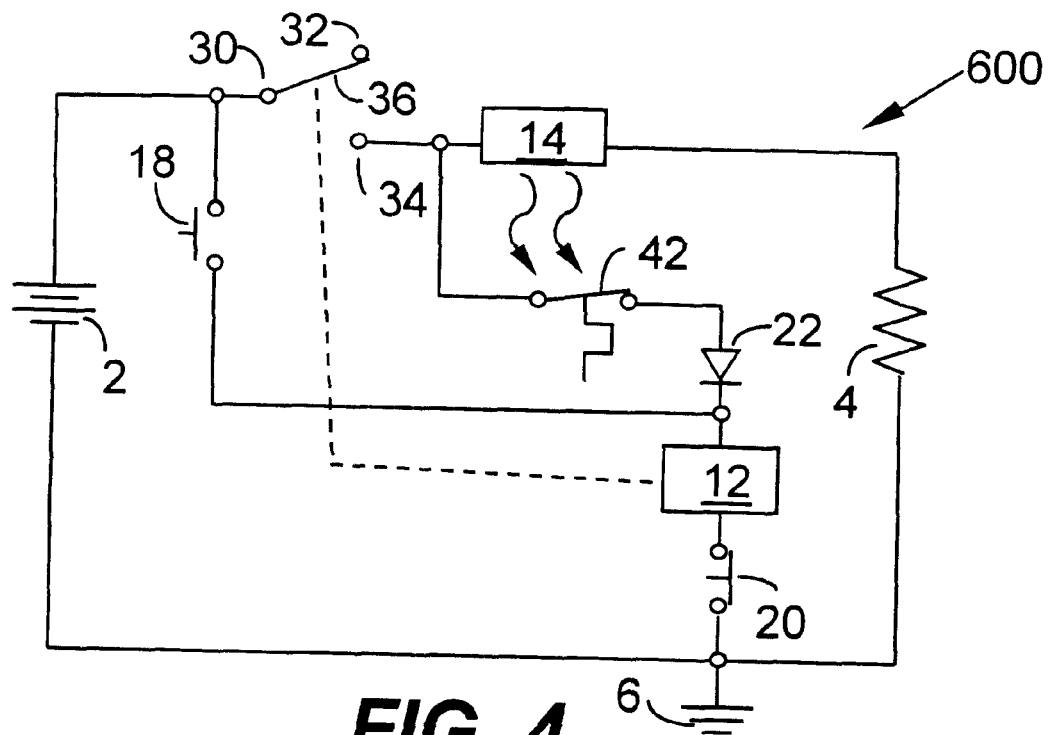
FIG. 4 is a fourth embodiment of the present invention employing a bimetal switch.

The circuit 600 shown in FIG. 4 is an alternate embodiment of the circuit shown in FIG. 3 in which the PTC device 8 is replaced by a bimetal switch 42. With the circuit 600 in an OFF is state, and the bimetal switch 42 in its closed state, the circuit 600 is turned on by momentarily pressing the ON switch 18. Current flows through the relay coil 12, energizing the relay coil 12 and causing the wiper 36 to move to the normally open contact 34. The diode 22 prevents current from flowing up through the bimetal switch 42 to the resistive element 14 and the load 4. With the ON switch 18 released, current flows through the resistive element 14 to the load 4, and also through the series combination of the bimetal switch 42, the diode 22 and the relay coil 12, thereby keeping the relay coil 12 energized. In case of an overcurrent, the resistive element 14 heats up causing the bimetal switch 42 to heat up and trip to its open state. The relay coil 12 deenergizes and the wiper 36 moves to the normally closed contact 32. Current ceases to flow in the circuit 600, and the bimetal switch 42 cools and returns to its closed state. With the wiper 36 against the normally closed contact 32 and the relay coil 12 deenergized, the circuit 600 remains, i.e. latches, in the fault state and draws no "trickle current." The momentary OFF switch 20 is used to turn the circuit OFF under normal operating conditions.

FIG. 5 is an embodiment of an overcurrent protection circuit 700 employing a bimetal switch 42. However, in the circuit 700 in FIG. 5, the bimetal switch 42 provides the functionality of the sensor element, and the relay coil 12 and diode 22 provide the functionality of the control element. The circuit 700 employs an arrangement of a bimetal switch 42 with a relay coil 12 and a set of relay contacts 30 32 34 36. It also includes a diode 22, a momentary ON switch 18 and a momentary OFF switch 20. The relay contacts 30 32 34 36 are positioned between the power source 2 and the bimetal switch 42, with the center contact 30 connected to the power source 2 and the normally open contact 34 connected to the bimetal switch 42. In the circuit 700 the bimetal switch 42 is in series with the parallel combination of the load 4 and relay coil 12. With the circuit 700 in an OFF state, and the bimetal switch 42 in its closed state, the circuit 700 is turned on by momentarily pressing the ON switch 18. Current flows through the relay coil 12, energizing the relay coil 12 and causing the wiper 36 to move to the normally open contact 34. The diode 22 prevents full operating current from flowing through the ON switch to the load 4 when the ON switch 18 is closed. With the ON switch 18 released, current flows through the bimetal switch 42 to the load 4, and also through the series combination of the diode 22 and the relay coil 12, thereby keeping the relay coil 12 energized. In case of an overcurrent, the bimetal switch 42 heats up and trips to its open state. The relay coil 12 deenergizes and the wiper 36 moves to the normally closed contact 32. Current ceases to flow in the circuit 700, and the bimetal switch 42 cools and returns to its closed state. The circuit 700 latches in the fault state with no current flowing in the circuit 700. This circuit 700 has an advantage in that since the bimetal switch 42 opens when it heats up, rather than just increase in impedance, the bimetal switch 42 may be placed in series with both the relay coil 12 and the load 4 with confidence that the relay coil 12 will deenergize when the bimetal switch 42 opens. The momentary OFF switch 20 is used to turn the circuit OFF under normal operating conditions.

What is claimed is:

1. An electrical protection system which can be connected between an electrical power supply (2) and an electrical load (4) to form an operating circuit, the operating circuit having an on state and an off state and comprising a current carrying line and a return line (6), and which when so connected protects the circuit from overcurrents, the system having a normal operating condition and a fault condition, and comprising:

a. a circuit interruption element (30,32,34,36), which, when the system is so connected and is in its normal operating condition, is connected in series between the power supply and the load so that an operating current passes through the circuit interruption element and the load (4), and which has
      i. a closed state (30,36,34), which permits the flow of a normal operating current between the power supply (2) and the load (4) when the system is in the normal operating condition, and
      ii. an open state (30,36,32), which permits the flow of substantially no operating current between the power supply and the load, when the system is in the fault condition;

b. a sensor element (14), which, when the system is so connected and is in its normal operating condition, is connected in series with the circuit interruption element and the load so that the operating current passes through the circuit interruption element, the sensor element and the load, and which has
      i. a normal state, when the operating current in the system does not exceed the normal operating current by a predetermined amount; and
      ii. a fault state, when the operating current in the system exceeds the normal operating current by the predetermined amount; and c. a control element (8,12), which, when the system is so connected, is responsively coupled with the sensor element and is controllably coupled with the circuit interruption element (36), and has an electrical characteristic which
      i. is low impedance when the sensor element is in the normal state,
      ii. is high impedance when the sensor element has the fault state, and
      iii. remains at the high impedance until the system is reset to the normal operating condition; and d. reset means (16) coupled to the control means for resetting the system from the fault condition to the normal operating condition;

the circuit interruption element (36) changing from its closed state to its open state, thereby causing the system to change from its normal operating condition to its fault condition and to remain in the fault condition, when the sensor element (14), has the fault state, until the reset means resets the system to the normal operating condition.

2. A system according to claim 1 wherein the sensor element comprises a heat-generating device for generating heat in the fault state.

3. A system according to claim 2 wherein the circuit interruption element comprises a set of relay contacts (30, 32,3436).

4. A system according to claim 3 wherein the control element comprises a series combination of
   a. a PTC device (8) thermally coupled with the heat-generating device and having a low resistance providing the low impedance when the sensor element is in the normal state and having a high resistance providing the high impedance when the sensor element is in the fault sate; and
   b. a relay coil (12) coupled to operate the relay contacts;
   the series combination being connected across the power supply between the current-carrying line upstream of the sensor element (14) and load, and the return line, with the PTC device connected to the current carrying line and the relay coil coupled to the return line.

5. A system according to claim 4 wherein the reset means comprises momentary make switch means in series between the current carrying line and the relay coil, when the system is in an off state, to change the operating system to an on state; and further comprising break switch means in series between the relay coil and the return line, when the system is in the on state, to change the system to the off state.

6. A system according to claim 5 wherein the control element comprises a diode connected in series between the PTC device and the relay coil to prevent operating current from flowing through the momentary make switch means during a system reset operation when the momentary make switch is momentarily closed.

7. A system according to claim 4 wherein the circuit interruption element is connected between the sensor element and the load.

8. A system according to claim 7, wherein the reset means comprises a normaly open switch (16) connected in series between the PTC device (8) and the relay coil (12).

9. A system according to claim 7 wherein the reset means comprises a normally closed switch connected in the return line between the power supply and the coil.

10. A system according to claim 3 wherein:
    a. the sensor element is connected between the circuit interruption element and the load; and
    b. the control element comprises a series combination of
       i. a bimetal switch thermally coupled with the sensor element and having substantially zero resistance providing said low impedance when the sensor is in its normal state and having substantially infinite resistance providing said high impedance when the sensor is in its fault state,
       ii. a diode, and
       iii. a relay coil coupled to operate the relay contacts.

11. A system according to claim 3 wherein the sensor element comprises a bimetal switch connected in series between the circuit interruption element and the load, and wherein the control element includes series combination of a diode connected to a node between the bimetal switch and the load, and a relay coil connected to the return line.

12. A system according to claim 11 wherein the reset means comprises momentary make switch means in series between the current carrying line and the relay coil, when the system is in an off state, to change the operating system to an on state; and further comprising break switch means in series between the relay coil and the return line, when the system is in the on state, to change the system to the off state.

* * * * *